(12) United States Patent
Um et al.

(10) Patent No.: US 9,934,325 B2
(45) Date of Patent: Apr. 3, 2018

(54) METHOD AND APPARATUS FOR DISTRIBUTING GRAPH DATA IN DISTRIBUTED COMPUTING ENVIRONMENT

(71) Applicant: Korea Institute of Science and Technology Information, Daejeon (KR)

(72) Inventors: Jung Ho Um, Jeollabuk-do (KR); Taehong Kim, Daejeon (KR); Chang Hoo Jeong, Daejeon (KR); Seungwoo Lee, Daejeon (JP); Hanmin Jung, Daejeon (KR); Won Kyung Sung, Daejeon (KR)

(73) Assignee: Korean Institute of Science and Technology Information (KR)

( * ) Notice: Subject to any disclaimer, the term of this patent is extended or adjusted under 35 U.S.C. 154(b) by 396 days.

(21) Appl. No.: 14/571,476

(22) Filed: Dec. 16, 2014

(65) Prior Publication Data

US 2016/0110474 A1 Apr. 21, 2016

(30) Foreign Application Priority Data

Oct. 20, 2014 (KR) ........................ 10-2014-0141981

(51) Int. Cl.
*G06F 17/30* (2006.01)

(52) U.S. Cl.
CPC ........ *G06F 17/30958* (2013.01); *G06F 17/30* (2013.01); *G06F 17/30498* (2013.01); *G06F 17/30528* (2013.01); *G06F 17/30584* (2013.01)

(58) Field of Classification Search
CPC combination set(s) only.
See application file for complete search history.

(56) References Cited

U.S. PATENT DOCUMENTS

| 5,274,643 | A | 12/1993 | Fisk | |
|---|---|---|---|---|
| 2004/0225639 | A1* | 11/2004 | Jakobsson | ......... G06F 17/30463 |
| 2010/0083194 | A1* | 4/2010 | Bagherjeiran | ......... G06F 17/509 716/132 |
| 2011/0029299 | A1* | 2/2011 | Zhu | ..................... G06F 17/5022 703/14 |
| 2011/0182479 | A1* | 7/2011 | Sese | .................. G06F 17/30958 382/113 |
| 2011/0273990 | A1* | 11/2011 | Rajagopalan | ........... H04L 45/66 370/238 |

(Continued)

FOREIGN PATENT DOCUMENTS

| JP | 2009-295013 A | 12/2009 |
|---|---|---|
| JP | 2013-062735 A | 4/2013 |
| KR | 10-1269428 B1 | 5/2013 |

*Primary Examiner* — Etienne Leroux
(74) *Attorney, Agent, or Firm* — DLA Piper LLP (US)

(57) ABSTRACT

A method and apparatus distributes graph data in a distributed computing environment. The method of distributing graph data in a distributed computing environment includes searching graph data for common sub-graphs, generating a partition by merging the common sub-graphs if, as a result of the search, the common sub-graphs are present and generating a partition by arranging the graph data if, as a result of the search, the common sub-graphs are not present, and calculating a processing cost of the graph data and allocating the partition based on the calculated processing cost.

10 Claims, 4 Drawing Sheets

(56) References Cited

U.S. PATENT DOCUMENTS

| | | | |
|---|---|---|---|
| 2012/0158780 A1* | 6/2012 | Koyanagi | G06F 17/30 707/769 |
| 2013/0003743 A1* | 1/2013 | Palmer | H04L 45/127 370/400 |
| 2014/0019490 A1* | 1/2014 | Roy | G06F 17/30073 707/798 |
| 2014/0081896 A1 | 3/2014 | Ranganathan et al. | |
| 2014/0156633 A1 | 6/2014 | Duan et al. | |

* cited by examiner

METHOD AND APPARATUS FOR DISTRIBUTING GRAPH DATA IN DISTRIBUTED COMPUTING ENVIRONMENT

CROSS REFERENCE TO RELATED APPLICATION

The present application claims the benefit of Korean Patent Application No. 10-2014-0141981 filed in the Korean Intellectual Property Office on Oct. 20, 2014, the entire contents of which are incorporated herein by reference.

BACKGROUND OF THE INVENTION

Technical Field

The present invention relates to a method and apparatus for distributing graph data in a distributed computing environment and, more particularly, to a method and apparatus for distributing graph data in a distributed computing environment, wherein a partition is generated based on common sub-graphs or vertexes depending on whether the common sub-graphs are present in the graph data and corresponding graph data is distributed to a partition having a minimum processing cost in each vertex.

Description of the Related Art

As the Internet is advanced, numerous data is generated and distributed by netizens every day. Recently, in many companies, in particular, in many search engine companies and web portals, to collect and accumulate huge amounts of data as much as possible and to extract meaningful data from the collected data as soon as possible become a company's competitiveness.

For this reason, many companies construct large-scale clusters at a low cost and are doing a lot of research into high-capacity distributed management and task distribution parallel processing technologies.

That is, the value of a large amount of data that is difficult to be processed by an existing single machine system is emerging. Distributed parallel systems are introduced into and used in various fields as alternatives for processing the large amount of data.

A hashing method is used to process a large amount of graph data in a distributed computing environment.

However, the hashing method has limited distributed computing performance for graph data due to data distributed without taking a graph structure into consideration and a network cost occurring because data distributed to different servers is searched for.

PRIOR ART DOCUMENT

Patent Document

A prior art 1: Korean Patent No. 1269428 entitled "System and Method for Data Distribution"

SUMMARY OF THE INVENTION

Accordingly, the present invention has been made keeping in mind the above problems occurring in the prior art, and an object of the present invention is to provide a method and apparatus for distributing graph data in a distributed computing environment, wherein a large amount of graph data may be equally distributed to servers in a distributed computing environment.

Another object of the present invention is to provide a method and apparatus for distributing graph data in a distributed computing environment, wherein the processing cost of graph data is predicted and the graph data is distributed based on the predicted processing cost.

In accordance with an aspect of the present invention, there is provided a method of distributing graph data in a distributed computing environment, including the steps of (a) searching graph data for common sub-graphs, (b) generating a partition by merging the common sub-graphs if, as a result of the search, the common sub-graphs are present and generating a partition by arranging the graph data if, as a result of the search, the common sub-graphs are not present, and (c) calculating a processing cost of the graph data and allocating the partition based on the calculated processing cost.

The graph data may include data formed of an edge, that is, a main line that connects a node represented by a vertex and another node in a form in which the nodes have directional or do not have directional.

The step (a) may include searching for the common sub-graphs based on the number and IDs of adjacent nodes in each node of the graph data.

The step (b) may include if, as a result of the search, the common sub-graphs are present, generating a partition by merging the common sub-graphs, and if, as a result of the search, the common sub-graphs are not present, arranging nodes in order of a larger number of adjacent nodes, selecting a node that belongs to the arranged nodes and that corresponds to higher ranking as a vertex, and generating a partition based on the selected vertex.

The step (c) may include calculating a minimum hop number H up to a common sub-graph or vertex in each vertex, the calculation function time complexity T of a vertex, and the number of vertexes M adjacent to a vertex stored in a different partition, calculating the processing cost of the graph data by applying weight to each of the calculated minimum hop number, the calculation function time complexity, and the number of adjacent vertexes, searching for a partition having a minimum calculated processing cost of the calculated processing costs, and allocating corresponding graph data to the retrieved partition.

If vertexes adjacent to each vertex are already allocated vertexes, a processing cost may be recalculated by applying a connection length P to the calculated processing cost.

In accordance with another aspect of the present invention, there is provided a computer-readable recording medium on which a program for executing a method of distributing graph data in a distributed computing environment has been recorded. The method may include searching graph data for common sub-graphs, generating a partition by merging the common sub-graphs if, as a result of the search, the common sub-graphs are present and generating a partition by arranging the graph data if, as a result of the search, the common sub-graphs are not present, and calculating the processing cost of the graph data and allocating the partition based on the calculated processing cost.

In accordance with yet another aspect of the present invention, there is provided an apparatus for distributing graph data in a distributed computing environment, including a common sub-graph search unit configured to search graph data for common sub-graphs, a partition generation unit configured to generate a partition by merging the common sub-graphs if, as a result of the search, the common sub-graphs are present and generate a partition by arranging the graph data if, as a result of the search, the common sub-graphs are not present, and a data distribution unit configured to calculate the processing cost of the graph data and allocate the partition based on the calculated processing cost.

The common sub-graph search unit may be configured to search for the common sub-graphs based on the number and IDs of adjacent nodes in each node of the graph data.

The partition generation unit may be configured to generate a partition by merging the common sub-graphs if, as a result of the search, the common sub-graphs are present and if, as a result of the search, the common sub-graphs are not present, arrange nodes in order of a larger number of adjacent nodes, select a node that belongs to the arranged nodes and that corresponds to higher ranking as a vertex, and generate a partition based on the selected vertex.

The data distribution unit may be configured to calculate a minimum hop number H up to a common sub-graph or vertex in each vertex, a calculation function time complexity T of a vertex, and the number of vertexes M adjacent to a vertex stored in a different partition, calculate the processing cost of the graph data by applying weight to each of the calculated minimum hop number, the calculation function time complexity, and the number of adjacent vertexes, search for a partition having a minimum calculated processing cost of the calculated processing costs, and allocate corresponding graph data to the retrieved partition.

The data distribution unit may be configured to recalculate a processing cost by applying a connection length P to the calculated processing cost.

DETAILED DESCRIPTION

Hereinafter, a method and apparatus for distributing graph data in a distributed computing environment in accordance with embodiments of the present invention are described in detail below with reference to the accompanying drawings. The embodiments to be described are provided in order for those skilled in the art to easily understand the technical spirit of the present invention, and the present invention is not limited to the embodiments. Furthermore, matters represented in the accompanying drawings have been diagrammed in order to easily describe the embodiments of the present invention, and the matters may be different from forms that are actually implemented.

Each of elements to be described herein is only an example for implementing the embodiments of the present invention. Accordingly, in other implementations of the present invention, different elements may be used without departing from the spirit and scope of the present invention. Furthermore, each element may be purely formed of a hardware or software element, but may also be implemented using a combination of various hardware and software elements that perform the same function.

Furthermore, an expression that some elements are "included" is an expression of an "open-ended", and the expression simply denotes that the corresponding elements are present, but it should not be understood that additional elements are excluded.

In this specification, the term "graph data" may mean data formed of an edge, that is, a main line that connects a node represented by a vertex and another node in a form in which the nodes have directional or do not have directional.

Figure 1:
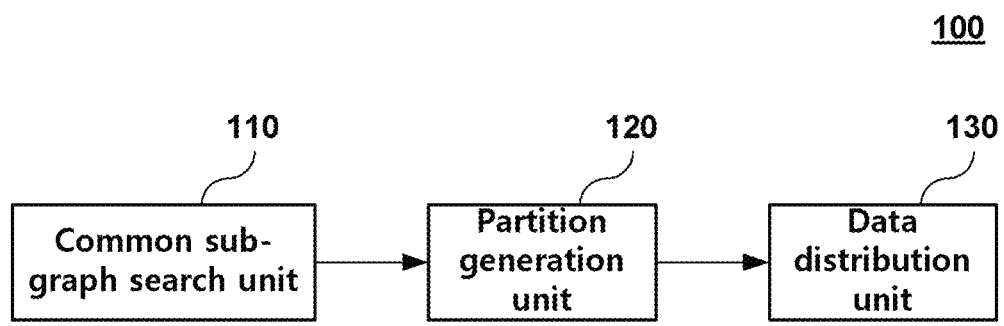
FIG. 1 is a schematic block diagram illustrating an apparatus for distributing graph data in a distributed computing environment in accordance with an embodiment of the present invention.

FIG. 1 is a schematic block diagram illustrating an apparatus for distributing graph data in a distributed computing environment in accordance with an embodiment of the present invention.

Referring to FIG. 1, the apparatus 100 for distributing graph data in a distributed computing environment includes a common sub-graph search unit 110, a partition generation unit 120, and a data distribution unit 130.

The common sub-graph search unit 110 searches graph data for common sub-graphs. That is, the common sub-graph search unit 110 searches for common sub-graphs, that is, a reference for distributing graph data, by checking the number and IDs of adjacent nodes in each node of the graph data. For example, the common sub-graph search unit 110 may search graph data for sub-graphs having the same number of adjacent nodes as common sub-graphs. The common sub-graphs are the result of searching the entire graph data for sub-graphs having the same graph structure and merging the retrieved sub-graphs. To this end, the common sub-graph search unit 110 searches for sub-graphs having the same number of adjacent nodes as the common sub-graphs because the number of adjacent nodes needs to be the same in the vertexes of respective target sub-graphs. Furthermore, when data is allocated to partitions, the common sub-graph search unit 110 checks the IDs of nodes in order to determine nodes stored in the partitions or to check whether a vertex is adjacent to the vertex of a merged common sub-graph. In this case, the common sub-graph may be a recyclable graph.

The partition generation unit 120 generates a partition based on common sub-graphs or vertexes depending on whether common sub-graphs are present in graph data.

If common sub-graphs are present in the graph data, the partition generation unit 120 generates a single partition by merging the common sub-graphs. If a common sub-graph is not present, the partition generation unit 120 arranges nodes in order of a larger number of adjacent nodes in each node, selects a node (or vertex) that belongs to the arranged nodes and that corresponds to higher ranking as a reference vertex, and generates a partition based on the selected reference vertex. The reason why the partition is generated based on the reference vertex is to store the reference vertex and adjacent vertexes, distributed when data is distributed by the data distribution unit 130, in the same partition.

The data distribution unit 130 calculates the processing cost of graph data and allocates a partition based on the calculated processing cost. In this case, the data distribution unit 130 distributes corresponding graph data to a partition having a minimum processing cost in each vertex.

A method of allocating, by the data distribution unit 130, a partition is described in more detail below.

The data distribution unit 130 calculates a minimum hop number H up to a common sub-graph or vertex for each vertex, the calculation function time complexity T of a vertex, and the number of vertexes M adjacent to a vertex stored in a different partition and calculates the processing cost of graph data by applying weight to each of the calculated minimum hop number, the calculated calculation function time complexity, and the calculated number of adjacent vertexes.

In this case, the data distribution unit 130 computes the calculation function time complexity using Equation 1.

$$T = O(v) + O(p_i) \quad (1)$$

In Equation 1, O(v) is the calculation cost of each vertex and may be a predetermined value depending on the length of data. $O(p_i)$ may be a data calculation cost allocated to servers and may be a predetermined value.

The data distribution unit 130 may calculate the number of adjacent vertexes M using Equation 2.

$$M = g(C_{adj} + C_{pi}) \quad (2)$$

In Equation 2, g is a network communication delay time, and $C_{adj}$ is the number of vertexes that belong to vertexes adjacent to a current vertex and that are stored in other partitions. $C_{pi}$ is a total number of vertexes that belong to vertexes adjacent to a vertex stored in a partition "pi" so far and that are stored in other partitions.

After calculating the minimum hop number, the calculation function time complexity, and the number of adjacent vertexes, the data distribution unit 130 calculates the processing cost of corresponding graph data using Equation 3.

$$\text{cost} = w_1 T + w_2 T + w_2 H \quad (3)$$

In Equation 3, $w_1$, $w_2$, and $w_3$ may be weight.

After calculating the processing cost using Equation 3, the data distribution unit 130 searches for a partition having a minimum calculated processing cost of the calculated processing costs. In this case, if the vertexes adjacent to the vertex are already allocated vertexes, the data distribution unit 130 recalculates a processing cost by applying a connection length P to the calculated processing cost. The connection length P means the number of other vertexes through which a vertex $N_i$ stored in a current partition passes and then returns back to a start vertex $N_i$ on graph data. Accordingly, if there is a path in which a vertex returns to its vertex (i.e., if a connection length P is present), a network communication cost between servers is required and thus the processing cost of graph data is increased. Accordingly, the data distribution unit 130 recalculates a processing cost by applying the connection length P to a calculated processing cost.

Thereafter, the data distribution unit 130 distributes corresponding graph data to a partition having a minimum processing cost.

Each of the common sub-graph search unit 110, the partition generation unit 120, and the data distribution unit 130 may be implemented by a processor required to execute a program on a computing apparatus. As described above, the common sub-graph search unit 110, the partition generation unit 120, and the data distribution unit 130 may be implemented using physical independent elements or may be implemented in a form in which the elements are functionally separated within a single processor.

Such elements that may be included in the apparatus 100 may be implemented using hardware, software, or a combination of them, or two or more of the elements may be implemented using a single piece of hardware or software.

The apparatus 100 may communicate other electronic devices in accordance with various communication standards and may be implemented through an electronic device capable of performing various data processing operations. For example, the apparatus 100 may be implemented in the form of a server apparatus or may be implemented in the form of various electronic devices in addition to such a server apparatus form. Furthermore, the apparatus 100 may be implemented in the form of a single electronic device or may be implemented in a form in which two or more electronic devices are combined.

Figure 2:
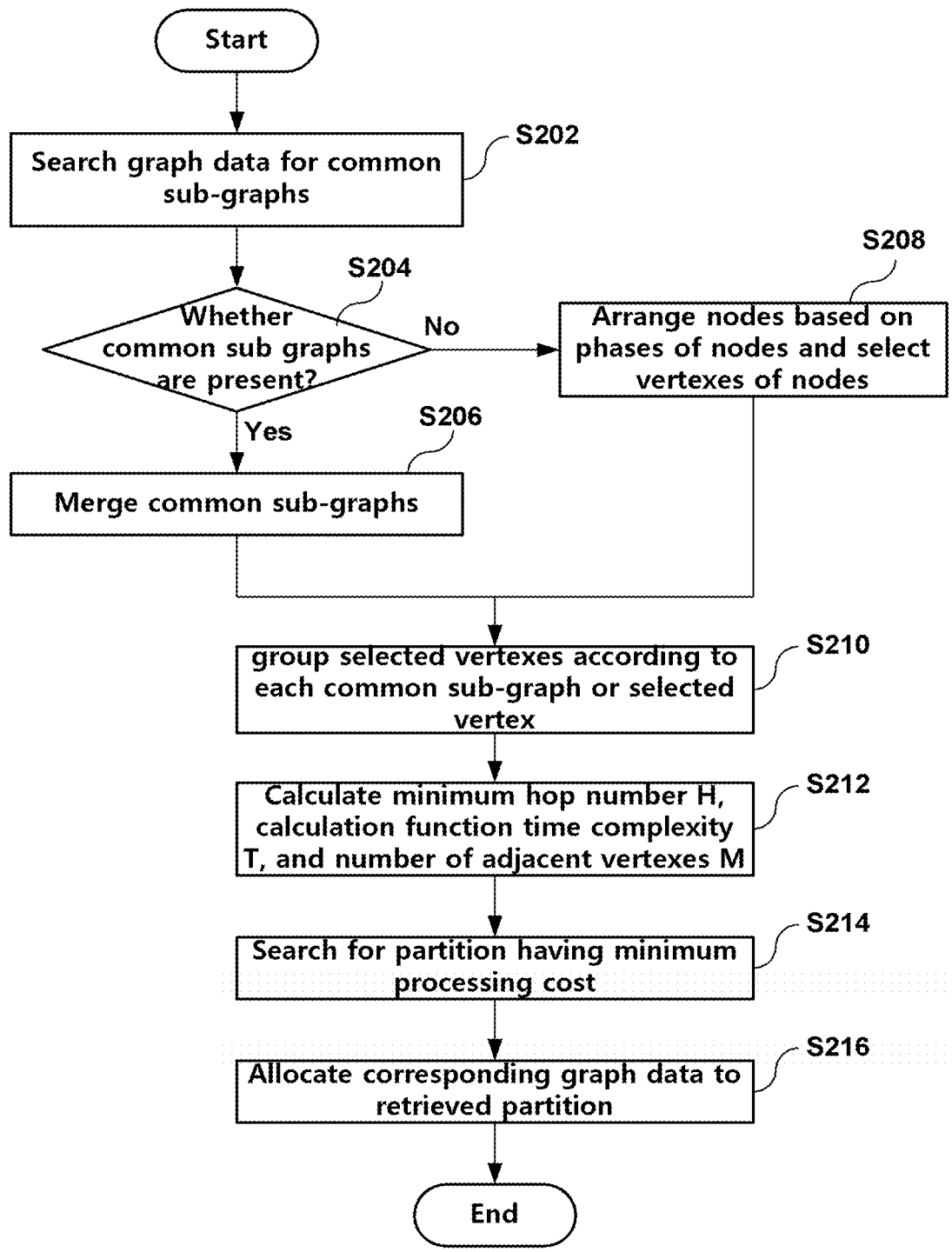
FIG. 2 is a diagram illustrating a method for distributing graph data in a distributed computing environment in accordance with an embodiment of the present invention.
Figure 3:
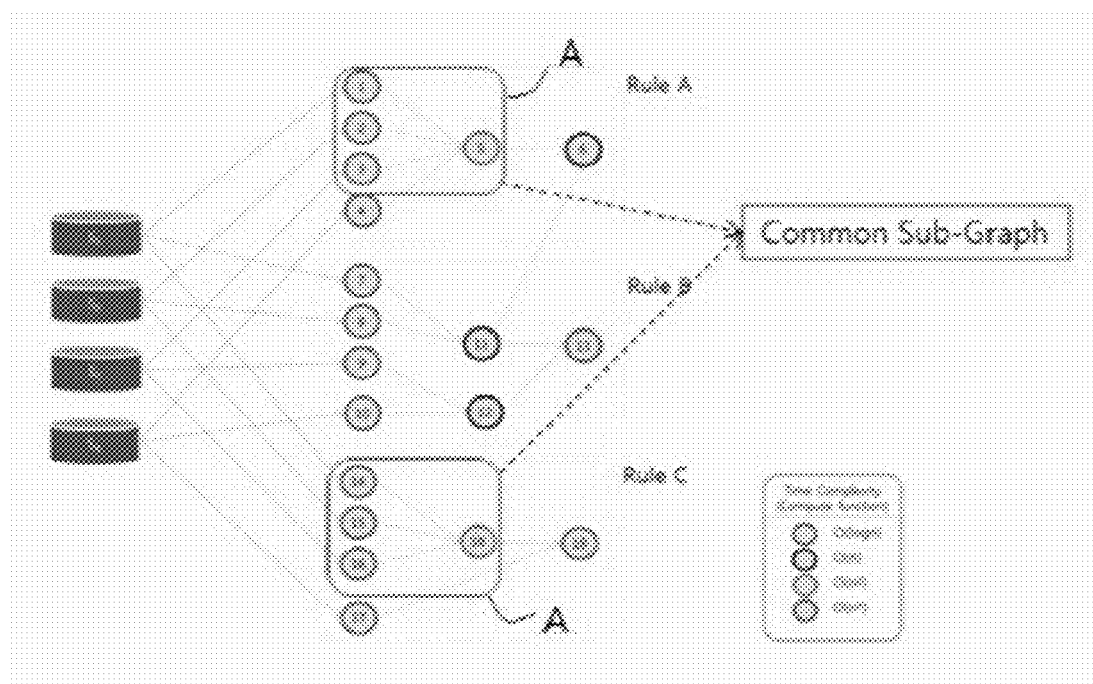
FIG. 3 is an exemplary diagram of graph data in accordance with an embodiment of the present invention.
Figure 4:
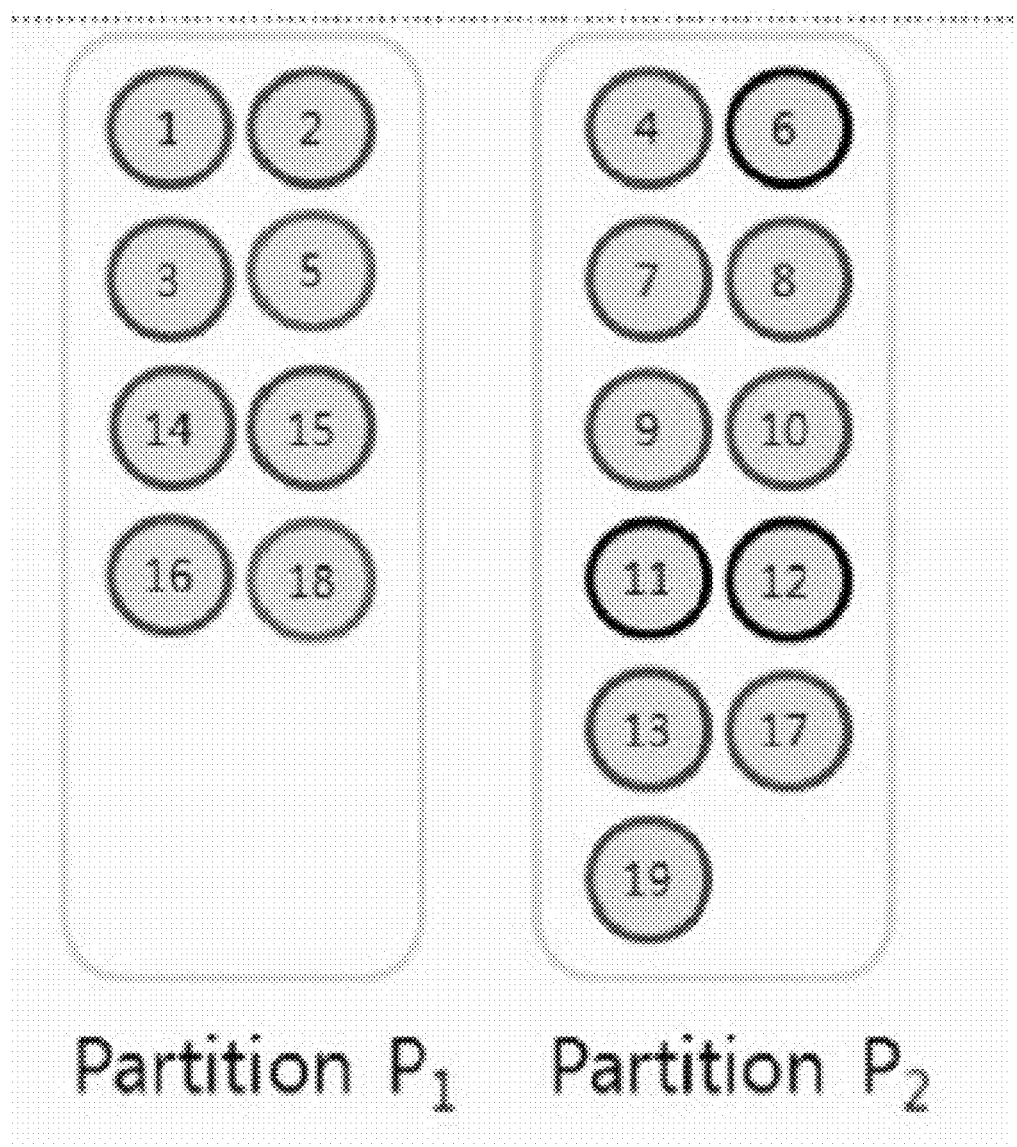
FIG. 4 is an exemplary diagram illustrating that the graph data illustrated in FIG. 3 has been distributed.

FIG. 2 is a diagram illustrating a method for distributing graph data in a distributed computing environment in accordance with an embodiment of the present invention, FIG. 3 is an exemplary diagram of graph data in accordance with an embodiment of the present invention, and FIG. 4 is an exemplary diagram illustrating that the graph data illustrated in FIG. 3 has been distributed.

Referring to FIG. 2, the apparatus searches graph data for common sub-graphs at step S202 and determines whether common sub-graphs are present based on a result of the search at step S204. That is, the apparatus checks the number and IDs of adjacent nodes in each node of the graph data and searches for common sub-graphs, that is, a reference for distributing the graph data.

If, as a result of the determination at step S204, the common sub-graphs are determined to be present, the apparatus merges the common sub-graphs at step S206.

If, as a result of the determination at step S204, a common sub-graph is determined to be not present, the apparatus arranges the nodes based on the phases of the nodes and selects the vertexes of the nodes at step S208. That is, the apparatus arranges the nodes in order of a larger number of adjacent nodes in each node and selects a vertex having the greatest number of adjacent nodes.

Thereafter, the apparatus generates a partition by grouping the selected vertexes according to each common sub-graph or selected vertex at step S210.

Thereafter, the apparatus calculates a minimum hop number H up to a common sub-graph or vertex for each vertex, the calculation function time complexity T of a vertex, and the number of vertexes M adjacent to a vertex stored in a partition not having the number of adjacent nodes at step S212 and searches for a partition having a minimum processing cost by applying weight to each of the calculated minimum hop number, the calculated calculation function time complexity, and the calculated number of adjacent vertexes at step S214.

The apparatus distributes corresponding graph data to the retrieved partition at step S216.

A method of distributing, by the apparatus, the graph data is described below with reference to FIGS. 3 and 4.

In the case of graph data, such as that of FIG. 3, the apparatus searches the graph data for common sub-graphs A. The apparatus generates a single partition $P_1$, such as that of FIG. 4, by merging the common sub-graphs A.

In the case of nodes not having a common sub-graph, the apparatus arranges the nodes in order of a larger number of adjacent nodes in each node, selects a vertex having the largest number of adjacent nodes, and generates a partition $P_2$ by grouping the selected vertexes.

The method of distributing graph data in a distributed computing environment described so far in accordance with the present invention may be implemented in the form of a program, application, or system file for executing the method. The present invention may be implemented in the form of a computer-readable recording medium on which such a program has been recorded.

The method of distributing graph data in a distributed computing environment may be written in a program form, and codes and code segments that form the program may be easily deduced by a programmer skilled in the art. Furthermore, a program regarding the method of distributing graph data in a distributed computing environment may be stored in a readable medium readable by an electronic device and may be read and executed by an electronic device.

As described above, in accordance with the present invention, the processing cost of graph data can be reduced and distributed graph data processing performance can be significantly improved by predicting the processing cost of the graph data and distributing the graph data based on the predicted processing cost. Accordingly, the present invention may be used as a factor technology for a big data analysis system.

Furthermore, a local computation load can be reduced and data processing performance can be significantly improved because graph data is distributed by taking connectivity into consideration based on a common sub-graph or a reference vertex having a high phase.

As described above, those skilled in the art to which the present invention pertains will understand that the present invention may be implemented in various detailed forms without changing the technical idea or indispensable characteristics of the present invention. It will be understood that the aforementioned embodiments are illustrative and not limitative from all aspects. The scope of the present invention is defined by the appended claims rather than the detailed description, and the present invention should be construed as covering all modifications or variations derived from the meaning and scope of the appended claims and their equivalents.

What is claimed is:

1. A method of distributing graph data in a distributed computing environment, the method comprising:
   (a) searching graph data for common sub-graphs;
   (b) generating a partition, wherein the partition is generated by merging the common sub-graphs if, as a result of the search, the common sub-graphs are present, and the partition is generated by arranging the graph data if, as a result of the search, the common sub-graphs are not present;
   (c) calculating a processing cost of the graph data, searching for a partition having a minimum calculated processing cost of the calculated processing costs and allocating the partition based on the calculated processing cost, and
   (d) distributing corresponding graph data to the partition having a minimum processing cost,
   wherein step (b) comprises:
      if, as a result of the search, the common sub-graphs are present, generating a partition by merging the common sub-graphs; and
      if, as a result of the search, the common sub-graphs are not present, arranging nodes in order of a larger number adjacent nodes, selecting a node that belongs to the arranged nodes and that corresponds to a highest ranked vertex, and generating a partition based on the selected vertex.

2. The method of claim 1, wherein the graph data comprises data formed of an edge that is a main line that connects a node represented by a vertex and another node in a form in which the nodes have directional or do not have directional.

3. The method of claim 1, wherein the step (a) comprises searching for the common sub-graphs based on a number and IDs of adjacent nodes in each node of the graph data.

4. The method of claim 1, wherein the step (c) comprises: calculating a minimum hop number H up to a common sub-graph or vertex in each vertex, a calculation function time complexity T of a vertex, and a number of vertexes M adjacent to a vertex stored in a different partition;
   calculating a processing cost of the graph data by applying weight to each of the calculated minimum hop number, the calculation function time complexity, and the number of adjacent vertexes;
   searching for a partition having a minimum calculated processing cost of the calculated processing costs; and
   allocating corresponding graph data to the retrieved partition.

5. The method of claim 4, wherein if vertexes adjacent to each vertex are already allocated vertexes, a processing cost is recalculated by applying a connection length P to the calculated processing cost.

6. A non-transitory computer-readable recording medium on which a program for executing a method of distributing graph data in a distributed computing environment has been recorded wherein the method comprises:
   (a) searching graph data for common sub-graphs;
   (b) generating a partition, wherein the partition is generated by merging the common sub-graphs if, as a result of the search, the common sub-graphs are present and the partition is generated by arranging the graph data if, as a result of the search, the common sub-graphs are not present;
   (c) calculating a processing cost of the graph data, searching for a partition having a minimum calculated processing cost of the calculated processing costs and allocating the partition based on the calculated processing cost, and
   (d) distributing corresponding graph data to the partition having a minimum processing cost,
   wherein step (b) comprises:
      if, as a result of the search, the common sub-graphs are present, generating a partition by merging the common sub-graphs; and
      if, as a result of the search, the common sub-graphs are not present, arranging nodes in order of a larger number adjacent nodes, selecting a node that belongs to the arranged nodes and that corresponds to a highest ranked vertex, and generating a partition based on the selected vertex.

7. An apparatus for distributing graph data in a distributed computing environment, the apparatus comprising a processor which executes:
   searching graph data for common sub-graphs;
   generating a partition, wherein the partition is generated by merging the common sub-graphs if, as a result of the search, the common sub-graphs are present and the partition is generated by arranging the graph data if, as a result of the search, the common sub-graphs are not present;
   calculating a processing cost of the graph data, searching for a partition having a minimum calculated processing cost of the calculated processing costs and allocating the partition based on the calculated processing cost, and distributing corresponding graph data to the partition having a minimum processing cost,
   wherein the partition generation unit is configured to:
      if, as a result of the search, the common sub-graphs are present, generate a partition by merging the common sub-graphs; and
      if, as a result of the search, the common sub-graphs are not present, arranging nodes in order of a larger number adjacent nodes, selecting a node that belongs to the arranged nodes and that corresponds to a highest ranked vertex, and generating a partition based on the selected vertex.

8. The apparatus of claim 7, wherein the processor is configured to search for the common sub-graphs based on a number and IDs of adjacent nodes in each node of the graph data.

9. The apparatus of claim 7, wherein the processor is configured to:
   calculate a minimum hop number H up to a common sub-graph or vertex in each vertex, a calculation function time complexity T of a vertex, and a number of vertexes M adjacent to a vertex stored in a different partition;
   calculate a processing cost of the graph data by applying weight to each of the calculated minimum hop number, the calculation function time complexity, and the number of adjacent vertexes;
   search for a partition having a minimum calculated processing cost of the calculated processing costs; and
   allocate corresponding graph data to the retrieved partition.

10. The apparatus of claim 9, wherein the processor is configured to recalculate a processing cost by applying a connection length P to the calculated processing cost.

* * * * *